W. L. JACKSON.
DRILL BIT FORMING AND SHARPENING MACHINE.
APPLICATION FILED DEC. 6, 1913.
1,094,655.
Patented Apr. 28, 1914.
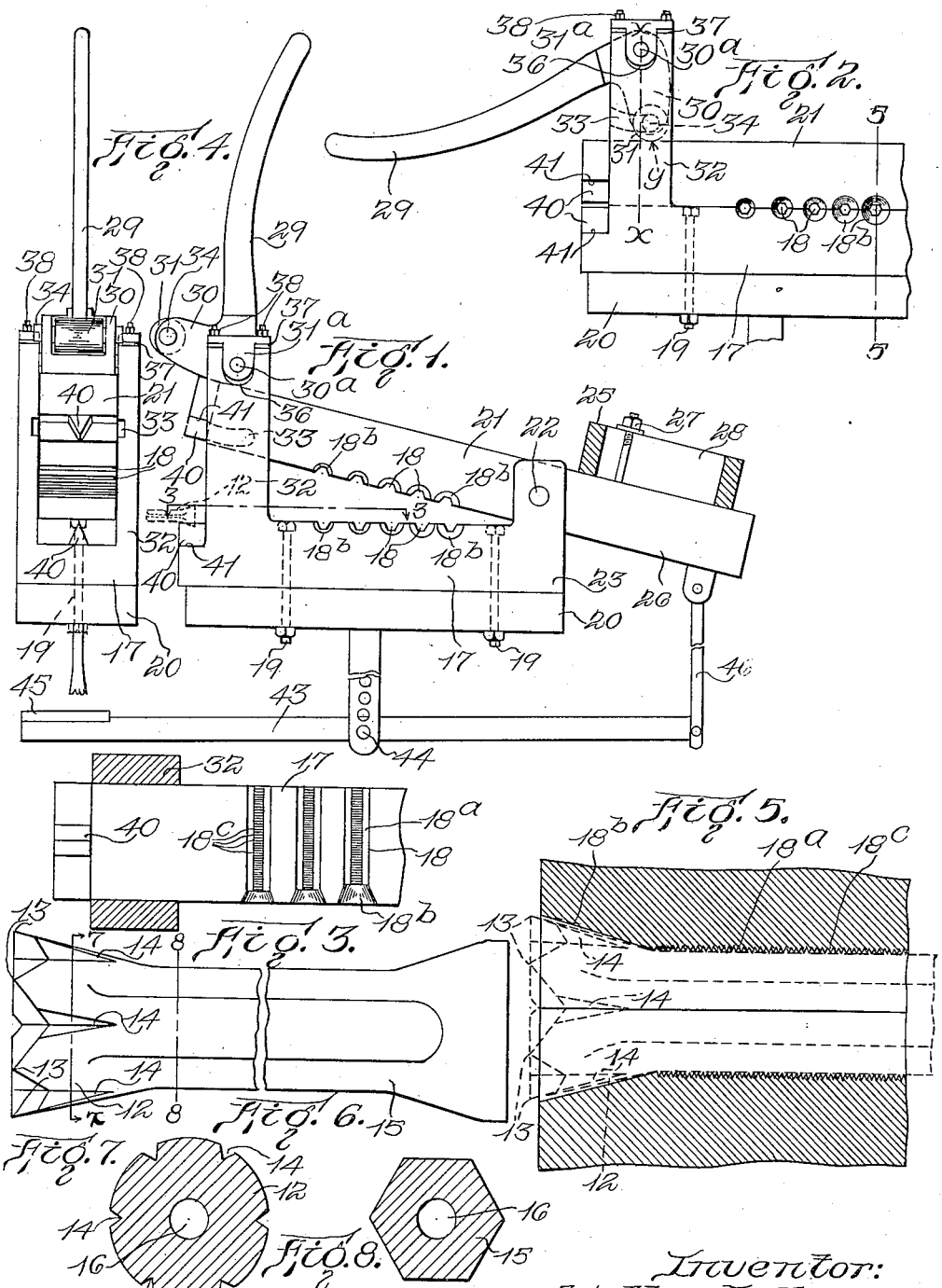

UNITED STATES PATENT OFFICE.

WALTER L. JACKSON, OF QUINCY, MASSACHUSETTS, ASSIGNOR OF ONE-HALF TO THEOPHILUS KING, OF QUINCY, MASSACHUSETTS.

DRILL-BIT FORMING AND SHARPENING MACHINE.

1,094,655.

Specification of Letters Patent.   Patented Apr. 28, 1914.

Application filed December 6, 1913.   Serial No. 805,031.

*To all whom it may concern:*

Be it known that I, WALTER L. JACKSON, a citizen of the United States, and a resident of Quincy, in the county of Norfolk and State of Massachusetts, have invented certain new and useful Improvements in Drill-Bit Forming and Sharpening Machines, of which the following is a specification.

This invention relates to means for forming and sharpening rock drill bits on hollow drill steel rods or bars.

An operative drill to which my invention is related consists of a length of hollow or tubular drill steel one end of which is upset by a swaging operation performed by the coöperation of a tooth forming dolly and a tapered confining die, the swaging operation forming a tapered or frusto-conical enlargement at one end of the drill steel and radial teeth on the outer and larger end of said enlargement. The upset toothed portion constitutes the bit and the remaining portion the shank of the drill. It is customary to repeatedly upset a drill of this character to sharpen its teeth after wear or breakage of the same, the drill as a whole being gradually shortened by successive swaging operations until its length is so far reduced as to render it useless. The drill steel rod or bar is usually polygonal in cross section while the tapered enlargement is circular in cross section, so that the drill has a polygonal shank and a bit, the perimeter of which is a cone frustum. In this perimeter are formed a series of longitudinal grooves constituting vents through which the comminuted stone and dust formed by the drill teeth are forced by compressed air entering the cavity through the bore of the drill. In operation of re-forming or of sharpening the bit these grooves are partially closed by the conjoint action of the dolly and the confining die, so that it is necessary to re-form the grooves after each swaging operation.

My invention has for its object to provide a simple and durable machine adapted to coöperate with an ordinary dolly in forming, re-forming, and sharpening bits of various sizes on drill steel rods or bars of uniform size, and also adapted to form and re-form said vent grooves.

The invention consists in the improvements which I will now proceed to describe and claim.

Of the accompanying drawings: Figure 1 represents a side elevation of a machine embodying my invention comprising fixed and movable vise jaws, the movable jaw being raised. Fig. 2 represents a view similar to a portion of Fig. 1, showing the movable jaw depressed. Fig. 3 represents a section on line 3—3 of Fig. 1 and a plan view of a portion of the fixed jaw. Fig. 4 represents an end elevation. Fig. 5 represents a section on line 5—5 of Fig. 2. Fig. 6 represents a side view of a drill. Fig. 7 represents a section on line 7—7 of Fig. 6. Fig. 8 represents a section on line 8—8 of Fig. 6.

The same reference characters indicate the same parts in all the figures.

Referring first to Figs. 6, 7 and 8: 12 represents the frusto-conical perimeter of the bit portion of a hollow or tubular rock drill to the forming and re-forming or sharpening of which the machine of my invention is related, said bit having the usual radial teeth 13 at its larger end, and the usual tapered longitudinal vent grooves 14 in its perimeter through which stone dust and small cuttings are forced by compressed air driven through the bore 16 of the drill. 15 represents the shank portion which is usually polygonal in cross section, and, as here shown, is hexagonal. The machine comprises a fixed elongated lower vise jaw 17, the upper face of which is provided with a series of transverse drill-receiving recesses 18 each composed of a shank-receiving portion 18$^a$ of polygonal form in cross section and formed to closely fit one half of the shank 15, and a tapered portion 18$^b$ of semicircular form in cross section, and formed to closely fit one half of the frusto-conical perimeter of the bit 12. The jaw 17 may be affixed by bolts 19 to a supporting member 20 which may be a bench, a tree stump or any other suitable support. 21 represents a movable elongated upper vise jaw which is hinged at 22 to fixed ears 23 on the lower jaw. The bottom face of the jaw 21 is adapted to bear on the upper face of the jaw 17 when the jaws are closed as shown by Fig. 2, and is provided with a series of recesses 18 which are formed like the recesses in the lower jaw. The two series of recesses coincide when the jaws are closed. The recess portions 18ª constitute clamp members which firmly engage and prevent endwise movement of the shank 15, the central face of each of said portions being preferably milled or roughened to form shank-engaging teeth 18ᶜ. The recess portions 18ᵇ form the members of a frusto-conical die corresponding in shape to the perimeter of the bit 12. The recess portions 18ª are of uniform size throughout the series, and the recess portions 18ᵇ vary in size throughout the series, as shown by Figs. 1, 2 and 3, so that bits of various sizes may be formed, and re-formed or sharpened, on drill steel bars or rods of a given uniform size.

In practice, the bit portion of the drill is suitably heated, the drill is placed in the proper recess 18 in the lower jaw, and the upper jaw is closed upon the lower jaw and confined by means hereinafter described. A dolly (not shown) of suitable form is then applied to the serrated end of the bit and is hammered by any suitable means until the heated bit is accurately conformed to the forming faces of the dolly and the die portions 18ᵇ of the jaw recesses, the tapered perimeter of the bit being slightly separated from the die portions 18ᵇ at the commencement of the operation as indicated by dotted lines in Fig. 5, so that the metal displaced by the swaging action of the dolly progresses rearward until it is arrested by the die portions 18ᵇ. During this operation endwise movement of the shank 15 is prevented by the recess portions 18ª which firmly grip the shank.

The upper jaw 21 is normally held yieldingly separated from the lower jaw 17, preferably by a counter weight 25 mounted on an arm 26 formed on or attached to the inner end portion of the upper jaw. Said weight may be adjustably secured to the arm 26 by a bolt 27 passing through a longitudinal slot 28 (Fig. 1) in the weight. A spring may be provided for this purpose if desired. To confine the upper jaw against the lower jaw I prefer to employ a lever 29 pivoted or mounted to oscillate on a pin 30ª which is journaled in vertically adjustable bearings 31ª supported by fixed standards 32 at opposite sides of the path of the swinging end of the upper jaw. The lever 29 has a cam shaped shorter arm 30, the curved face of which has a limited transverse bearing on the upper jaw and is adapted, in moving from the position shown by Fig. 1 to that shown by Fig. 2, to force the upper jaw against the lower jaw.

The lever arm 30 is preferably provided with an anti-friction roll 31 which constitutes the acting portion of the arm and transmits downward pressure to the upper jaw during the latter part of the above described movement of the lever, the periphery of the roll having a narrow transverse bearing on the upper jaw. Stop members are provided which arrest the arm 30 when it reaches the position shown by Fig. 2, the transverse line of contact of the roll with the upper jaw (indicated by the reference letter $y$) being at the inner side of a perpendicular line $x$, $x$ drawn from the center of the fulcrum or pivot 30ª so that displacement of the arm 30 from its jaw-holding position by the upward pressure of the upper jaw against it is prevented. Said stop members as here shown, are formed by the closed inner ends of slots 33 formed on the inner sides of the standards 32, and by the projecting ends of the stud 34 which connects the roll 31 to the arm 30, said stud ends entering the slots 33 and abutting against the closed ends thereof. The bearing blocks 31ª are vertically adjustable in slots 36 in the standards 32 and may be supported at different heights by shims 37 interposed between the upper ends of the standards 32 and ears formed on the blocks 31ª. Bolts 38 secured to the standards 32 and passing through the said ears and shims hold the blocks 31ª in any position to which they may be adjusted. Provision is thus made for compensating for wear of the contacting parts of the arm 30 and the upper jaw.

The described swaging operation tends to partially close the vent grooves 14 in the drill bit. To enable these grooves to be conveniently and quickly re-formed, I provide a pair of wedge shaped grooving dies 40 bearing on seats 41 which are offset from the meeting faces of the jaws 17 and 21, so that the dies do not strike each other when the jaws are closed, the lower die being adapted to enter a groove 14 in the under side of a bit held upon it as indicated by dotted lines in Fig. 1. Means are provided for quickly and forcibly depressing the upper jaw and its grooving die 40, and thus causing the latter to enter a groove 14 in the upper side of the bit, so that two grooves are simultaneously formed or opened by said dies. The preferred jaw-depressing means comprise a lever 43 fulcrumed at 44 to a fixed support and having a treadle 45 on one of its arms, and a rod 46 connecting the other arm of said lever with the arm 26 on the upper jaw. The depression of the treadle therefore causes a downward movement of the outer end of the upper jaw, and the described action of the dies 40 on two grooves in a bit. After these grooves have been formed the bit may be partially turned to subject two other grooves to the action of the grooving dies, and so on until all of the grooves are formed there being usually six grooves in each bit.

The described machine is particularly adapted for use in quarries and other places where improvised or portable supports for the lower jaw are required, said jaw being readily attachable either to a portable bench or to an improvised support such as a tree stump.

I claim:—

1. A drill bit forming and sharpening machine comprising an elongated fixed vise jaw having a plurality of transverse drill-receiving recesses, an elongated movable vise jaw hinged to the fixed jaw and having complemental transverse recesses arranged to register with the recesses of the fixed jaw when the jaws are closed, the movable jaw being normally separated from the fixed jaw, and means for confining the movable jaw against the fixed jaw, said recesses having polygonal drill shank-engaging portions of uniform size, and end portions constituting frusto-conical forming dies of different sizes, whereby bits of different sizes may be formed on shanks of a uniform size.

2. A drill bit forming and sharpening machine comprising an elongated fixed vise jaw having a plurality of transverse drill-receiving recesses, an elongated movable vise jaw hinged to the fixed jaw and having complemental transverse recesses arranged to register with the recesses of the fixed jaw when the jaws are closed, the movable jaw being normally separated from the fixed jaw, and means for confining the movable jaw against the fixed jaw, said recesses having polygonal drill shank-engaging portions of uniform size and end portions constituting frusto-conical forming dies of different sizes whereby bits of different sizes may be formed on shanks of a uniform size, the said polygonal recess portions being provided with roughened faces adapted to prevent endwise movement of a drill shank confined in said recesses.

3. A drill bit forming and sharpening machine comprising an elongated fixed vise jaw, an elongated movable vise jaw hinged to the fixed jaw, said jaws having meeting faces provided with transverse shank-holding and bit-forming recesses, means being provided for yieldingly pressing the movable jaw upwardly from the fixed jaw, standards on the fixed jaw at opposite sides of the path of the outer end portion of the movable jaw, provided with stop members at their inner sides, and a lever pivoted to said standards and having a cam shaped shorter arm bearing on the movable jaw and adapted to depress the latter into contact with the lower jaw, said shorter arm being provided with stop members coöperating with the stop members on the standards to arrest the jaw-depressing movement of the lever when the bearing of the shorter arm on the movable jaw is at the inner side of a perpendicular line from the axis of the lever, whereby displacement of the lever by the upward pressure of the movable jaw against it is prevented.

4. A drill bit forming and sharpening machine comprising an elongated fixed vise jaw, an elongated movable vise jaw hinged to the fixed jaw, said jaws having meeting faces provided with transverse shank-holding and bit-forming recesses, means being provided for yieldingly pressing the movable jaw upwardly from the fixed jaw, standards on the fixed jaw at opposite sides of the path of the outer end portion of the movable jaw, provided with stop members at their inner sides, a lever pivoted to said standards and having a cam shaped shorter arm bearing on the movable jaw and adapted to depress the latter into contact with the lower jaw, and means for vertically adjusting the fulcrum of said lever to compensate for wear.

In testimony whereof I have affixed my signature, in presence of two witnesses.

WALTER L. JACKSON.

Witnesses:
C. F. Brown,
P. W. Pezzetti.

Copies of this patent may be obtained for five cents each, by addressing the "Commissioner of Patents, Washington, D. C."